US010059587B2

(12) United States Patent
Hart

(10) Patent No.: US 10,059,587 B2
(45) Date of Patent: Aug. 28, 2018

(54) OZONE GENERATOR

(71) Applicant: David Hart, Bend, OR (US)

(72) Inventor: David Hart, Bend, OR (US)

( * ) Notice: Subject to any disclaimer, the term of this patent is extended or adjusted under 35 U.S.C. 154(b) by 183 days.

(21) Appl. No.: 15/177,566

(22) Filed: Jun. 9, 2016

(65) Prior Publication Data
US 2017/0015556 A1 Jan. 19, 2017

Related U.S. Application Data

(60) Provisional application No. 62/192,087, filed on Jul. 14, 2015.

(51) Int. Cl.
*C01B 13/11* (2006.01)
(52) U.S. Cl.
CPC .......... *C01B 13/11* (2013.01); *C01B 2201/12* (2013.01)

(58) Field of Classification Search
None
See application file for complete search history.

(56) References Cited

U.S. PATENT DOCUMENTS 3,309,304 A * 3/1967 Caplan .................... C01B 13/11
422/186.07
3,457,160 A * 7/1969 Fortier .................... C01B 13/11
422/186.07

\* cited by examiner

*Primary Examiner* — Kishor Mayekar
(74) *Attorney, Agent, or Firm* — Hancock Hughey LLP

(57) ABSTRACT

An ozone generator is contained in a housing having a fan for inducing air flow through the housing and over an ozone generating plate where atmospheric oxygen is electrochemically converted to ozone, which flows out of the housing through a grid opening. The ozone generating plate is defined by a glass plate having electrically conductive grids on both sides thereof and each grid is electrically powered to create corona discharge from the conductor; as air and oxygen in the air flows over the plate it is converted to ozone.

11 Claims, 5 Drawing Sheets

OZONE GENERATOR

TECHNICAL FIELD

The present invention relates to an apparatus for generating ozone, and more specifically, to a high efficiency ozone generator designed primarily for purposes of deodorizing and sanitization.

BACKGROUND

Ozone is known to be highly effective when used as an agent for sanitizing and deodorizing. As a result, ozone is used often by commercial cleaning enterprises, especially for remediation after destructive events such as fires and floods.

Ozone generators are used to produce ozone for the purposes of sanitizing and deodorizing. However, most ozone generators that are used for commercial cleaning, sanitizing and deodorizing tend to be large, heavy and somewhat unwieldy to use. Moreover, many known ozone generators are not highly efficient in either their use of power or their output of ozone.

There is an ongoing need for ozone generators that are efficient, easy to use and easy to transport.

The present invention is an ozone generator that in a first preferred embodiment meets the needs of the industry. It is highly efficient in terms of the generation and output of ozone, and the unit is light and easily transported to and installed at job sites.

BRIEF DESCRIPTION OF THE DRAWINGS

The invention will be better understood and its numerous objects and advantages will be apparent by reference to the following detailed description of the invention when taken in conjunction with the following drawings.

DETAILED DESCRIPTION OF THE ILLUSTRATED AND PREFERRED EMBODIMENTS OF THE INVENTION

Figure 1:
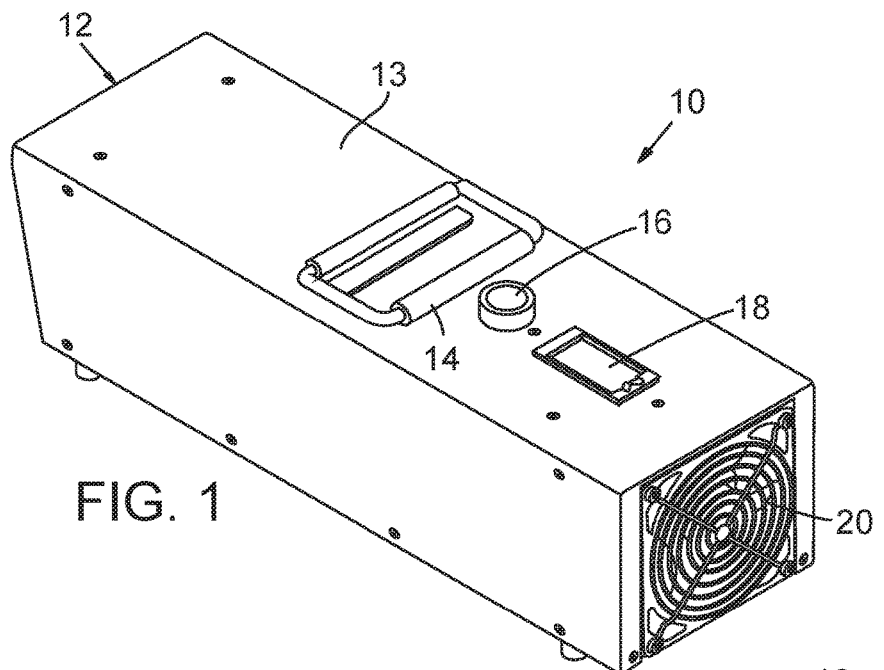
FIG. 1, is an upper perspective of a first illustrated embodiment of an ozone generator according to the present invention, showing the generator with its enclosure.

The invention will now be described in detail with reference to the drawings. A first preferred embodiment of an ozone generator 10 according to the present invention is illustrated. In normal use the ozone generator 10 is oriented on a surface such as a floor that is nominally horizontal. At times in this description the relative positions of structural components of the generator 10 are described using relative directional terms. In all cases, these terms are based upon an horizontal surface on which the generator 10 as it is positioned during normal and intended use. The upper or top of the generator 10 is thus the top of the apparatus as shown in the view of FIG. 1. Other relative directional terms correspond to this general naming convention: the "lower" or bottom of the apparatus is opposite the top. "Inner" or "inward" refers to the structural center of the apparatus and the direction from the outer portions of the device toward the center of it, and so on.

Figure 3:
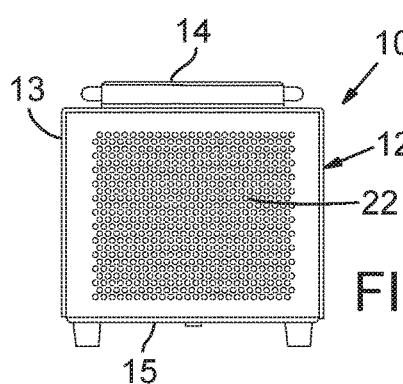
FIG. 3 is an end elevation view of the ozone generator shown in FIG. 1, illustrating the ozone output end of the generator through which ozone generated in the apparatus is output.
Figure 4:
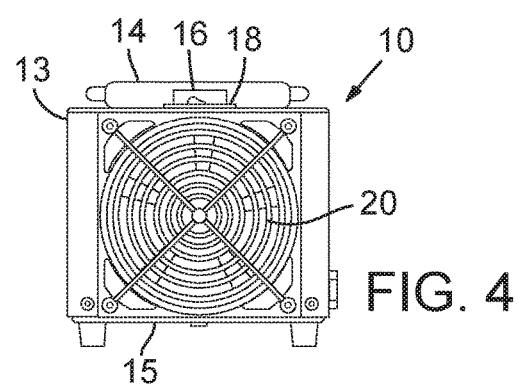
FIG. 4 is an end elevation view of the ozone generator shown in FIG. 1, illustrating the air intake end of the generator into which air is drawn during operation.

With continuing reference to FIG. 1, ozone generator 10 comprises a compact and easily transported unit that is contained in a housing 12 and which includes a carrying handle 14. A power, on/off switch 16 is located on an upper surface of housing 12 and the generator 10 includes a status screen 18 such as an LCD screen that displays operational status, a timer, etc. A fan 20 is located in a first end of the housing 12 and a grill 22 (see FIG. 4) is positioned at the opposite end of the housing—as detailed below, operation of fan 20 moves air through the housing and over an ozone-generating plate where oxygen is converted to ozone, and the ozone is blown through a grill 22 at the second end of the housing. The fan is thus located at the air intake end of the generator 10 and the end of generator 10. FIG. 3 is an elevation view of the ozone outlet end of generator 10 showing grill 22—the ozone outlet end at grill 22 is opposite the air intake end.

Figure 2:
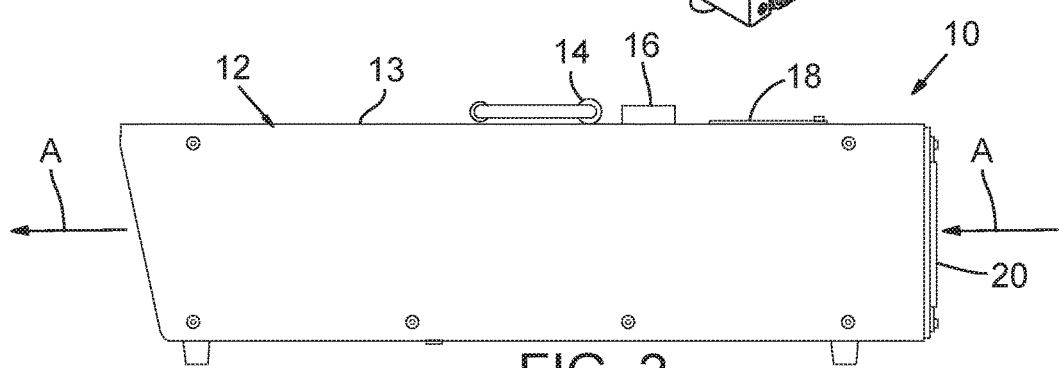
FIG. 2 is a side elevation view of the ozone generator shown in FIG. 1.

FIG. 2 is a side elevation view of generator 10 with housing 12 in place. Air movement into air intake end via fan 20, through generator 10 where ozone is generated, and exits through the ozone outlet, and is shown generally with arrows A in FIG. 2.

Figure 5:
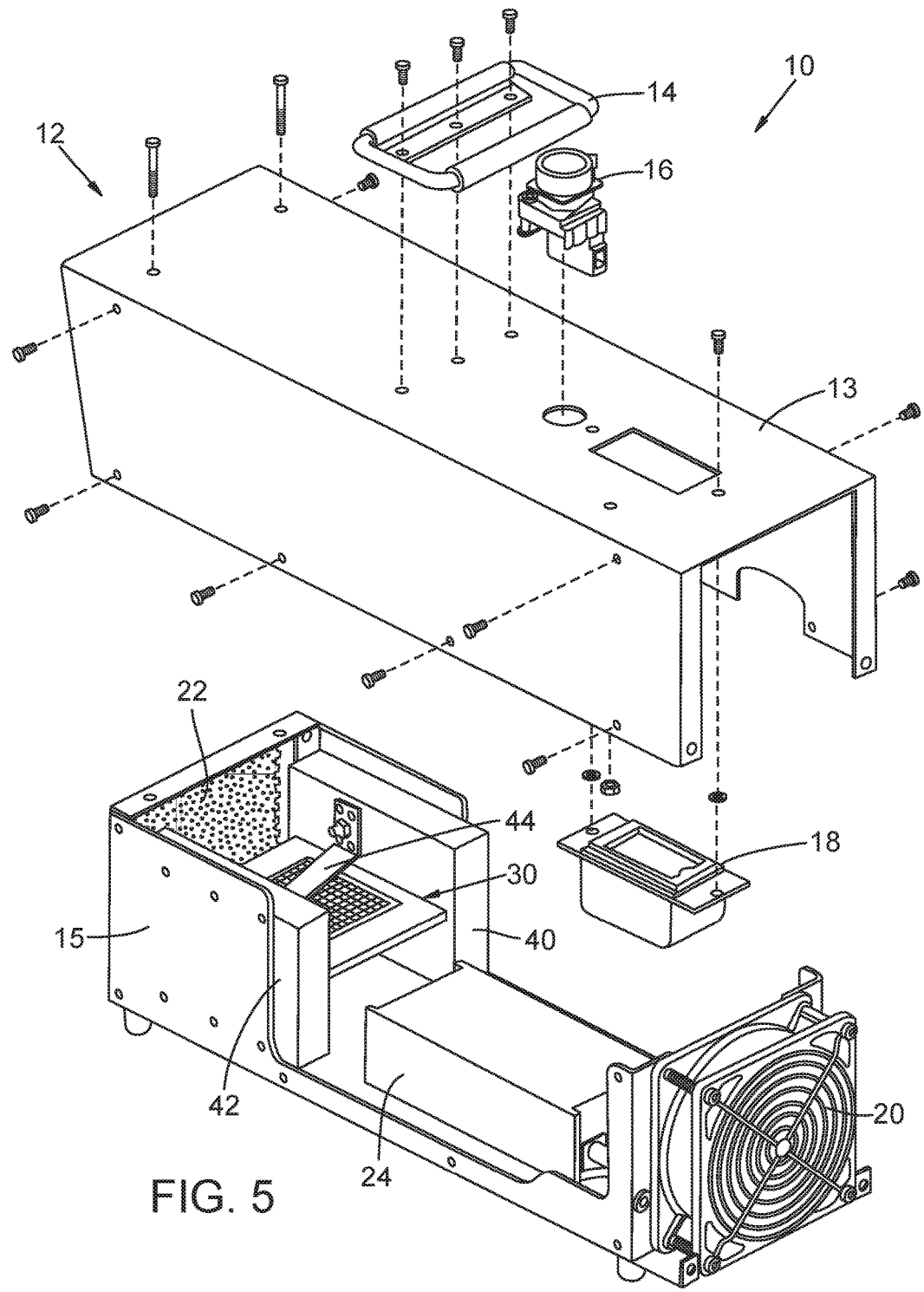
FIG. 5 is an upper perspective and partially exploded view of the ozone generator shown in FIG. 1 and in which the enclosure housing is shown separated from the base to illustrate the internal components of the apparatus.

With reference now to FIG. 5, in which generator 10 is shown in partially exploded view with the housing 12 separated from select components, it may be seen that the entire housing and all internal and operational components are designed for quick and easy assembly and disassembly with conventional fasteners such as the screws shown in FIG. 5. The power switch 16 is a conventional on/off switch and display screen 18 includes operational firmware including a countdown timer so that a user can select a desired timed period for operation of the generator 10 (or may alternately run the generator on a continuous basis). It may be seen that housing 12 comprises an upper component 13 and a base component 15. Fan 20 at the intake end of generator 10 is attached with conventional screws, as is grill 22 at the outlet end. The interior of the housing defines an open passageway through which air flows from the fan through the grill (arrows A, FIG. 2), and as detailed below, over both sides of ozone generating plate 30.

Figure 6:
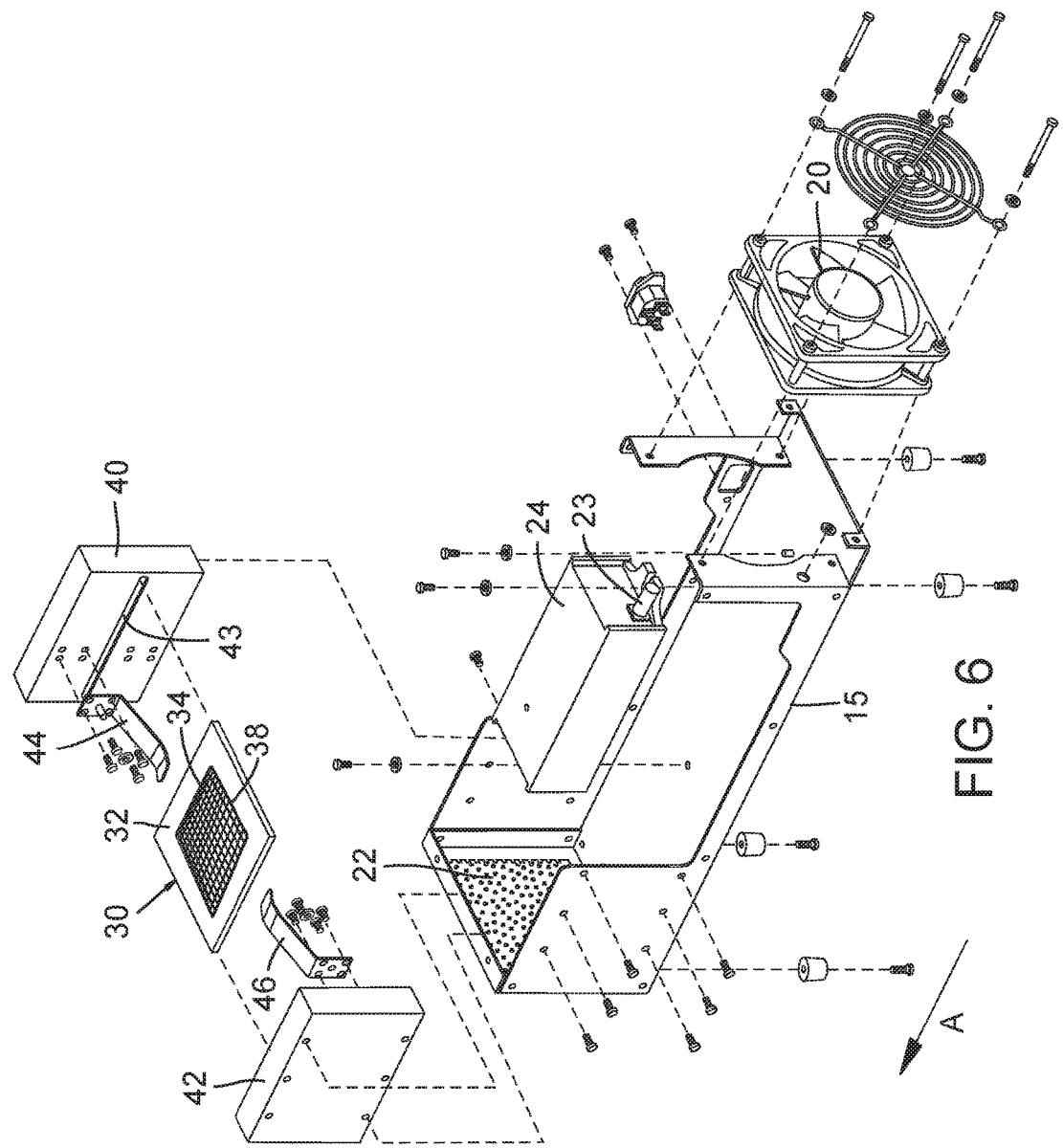
FIG. 6 is an upper perspective and partially perspective view of the ozone generator shown in FIG. 1 and in which the internal components of the apparatus are shown in exploded, perspective view.

FIG. 6 is an exploded perspective view operational components of generator 10 in exploded view, including the internal operational components of generator 10.

Operational components of generator 10 include a power supply 24 that is attachable to standard 110v power supply with a conventional cord 23 (most of which is not shown for simplicity and clarity). A conventional and commercially available power supply suitable for use with the present invention is a commercial duty solid state electronic transformer providing 10,000 volt output, preferably self-adjusting to the load, at 30 ma with 120v input. A neon sign transformer sold under the model number JA-A410EL is an appropriate power supply. Of course, there are other power supplies that will work as well.

Power supply 24 is electrically connected to power switch 16 to power on, off generator 10 and interfaces with display screen electronics to control the operational aspects of the power supply.

A fan that is appropriate for use as fan 20 for generator 10 also is conventional and there are numerous commercial products on the market that may be substituted for the fan shown above. The fan 20 is electrically interfaced with power supply 24 and preferably has an output of about 165 cfm.

Ozone generator plate 30 is a corona discharge plate that is located in the passageway defined in housing 12, downstream of fan 20 and immediately upstream of grill 22. Generator plate 30 is defined by a central plate of borosilicate glass plate 32, preferably about 5 mm thick and preferably rectangular and measuring about 114 mm×114 mm in its periphery, although the invention is not limited to a square plate as other specific shapes and dimensions work just as well. Glass plate 32 is sandwiched between upper and lower conductive wire mesh grids 34 and 36, which adhered to the upper and lower surfaces of the glass plate with high temperature silicone adhesive 38. As best seen in, for examples 8, 9 and 10, the wire mesh grids 34 and 36 do not extend to the lateral edges of glass plate 32. This allows the lateral edges of the glass plate to be supported by non-conductive insulating blocks 40 and 42, which are mounted in housing 12.

The wire mesh used for grids 34 and 36 is a conductive metal grid (e.g., stainless steel) with a mesh size of 4 per inch, wire diameter of 0.047 inch, opening size of 0.203 inch and opening percentage of 66%. These are preferred dimensions but the invention is not limited to these dimensions as will be appreciated by those of skill in the art.

Figure 7:
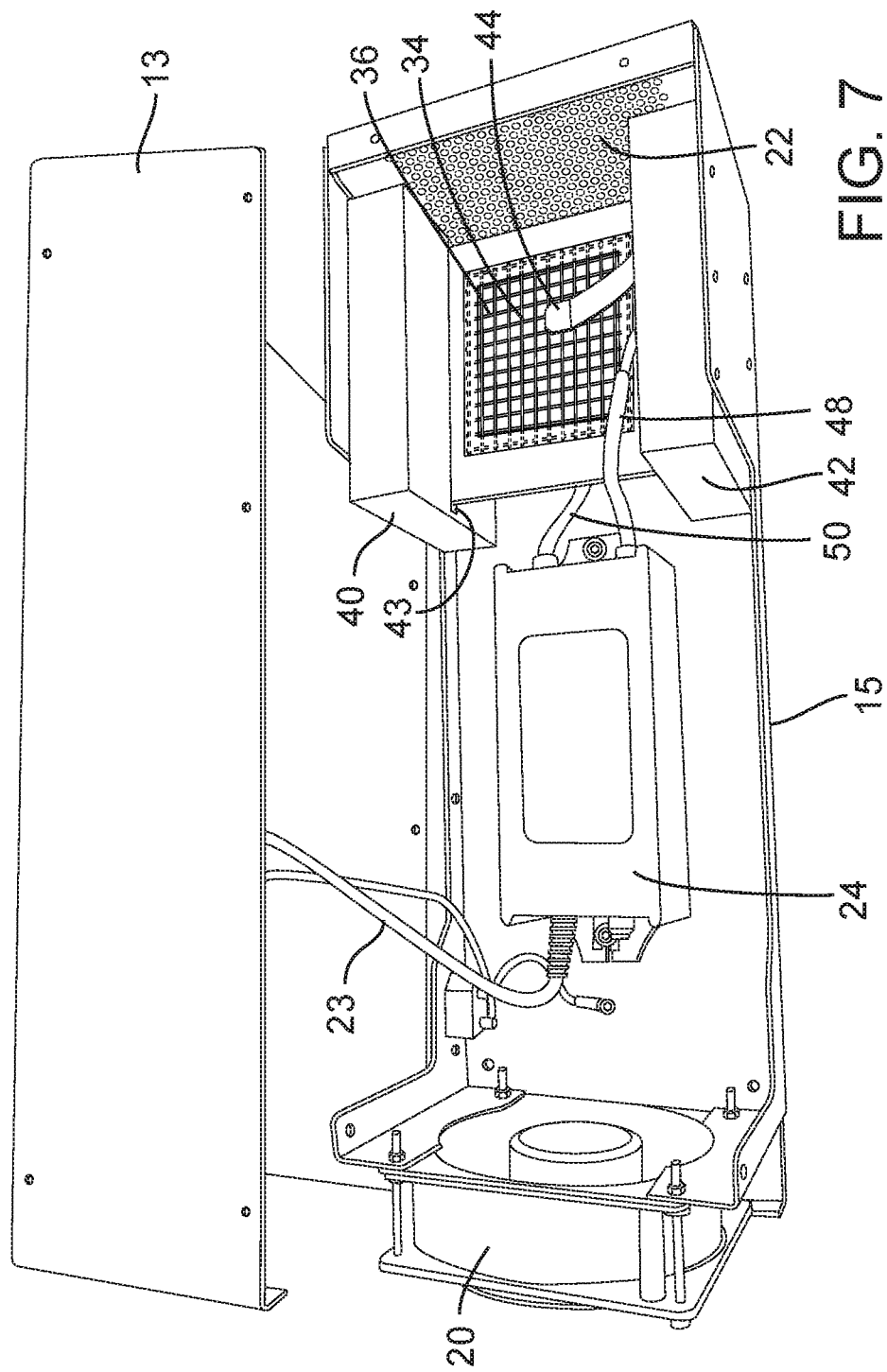
FIG. 7 is an upper perspective and partially exploded view of the internal components of the ozone generator according to the present invention.
Figure 8:
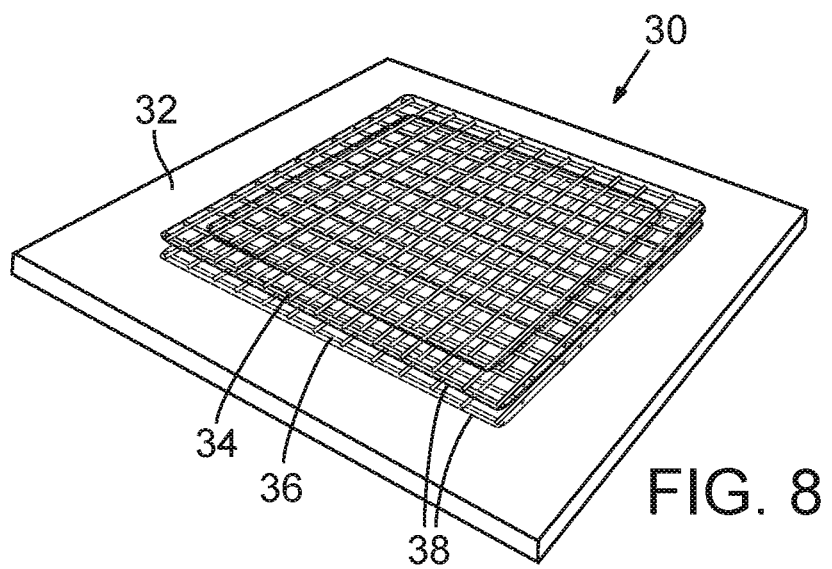
FIG. 8 is a perspective view of the ozone generator plate according to the present invention shown in isolation.
Figures 9, 10:
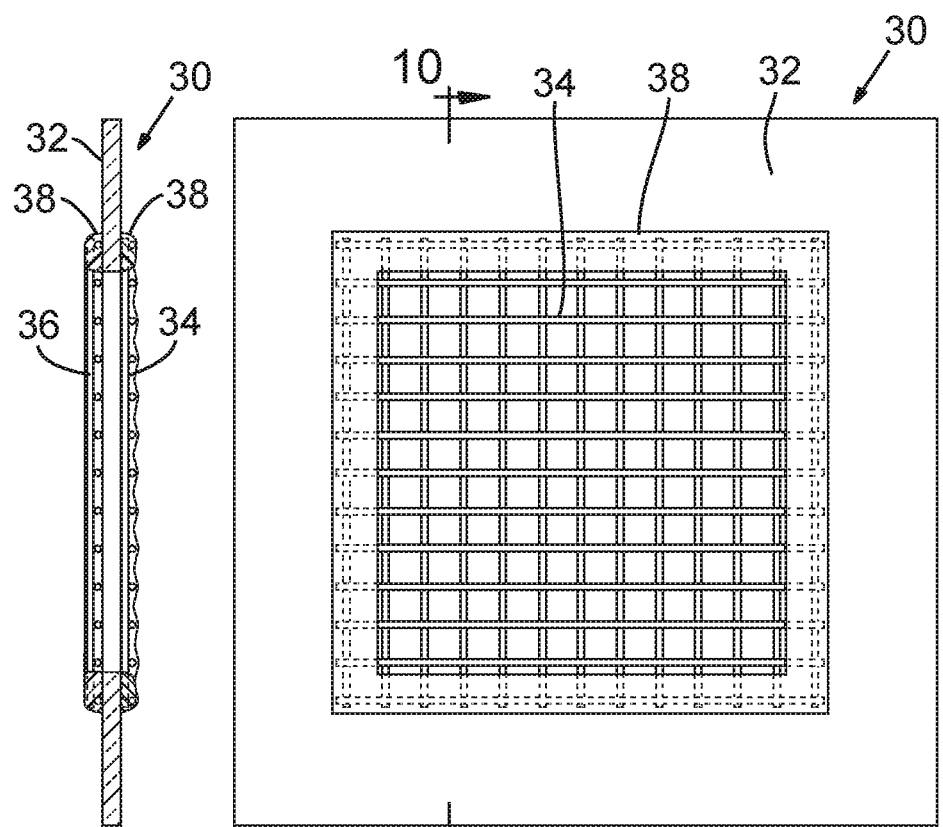
FIG. 9 is an upper plan view of the ozone generator plate shown in FIG. 8.
FIG. 10 is a cross sectional view of the ozone generator plate shown in FIG. 9, taken along the line 10-10 of FIG. 9.

As best seen in FIGS. 6 and 7, a first, upper conductor 44 is mounted to insulating block 40, and a second, lower conductor 46 is mounted to insulating block 42. As seen in FIG. 7, conductor 44 is attached to power supply 24 with wire 48 and conductor 46 is likewise powered from power supply 24 through wire 50 so that power from the power supply is delivered to the respective conductors, and through the conductors to the grids 34 and 36, as detailed. The conductors 44 and 46 are preferably resilient metal. They are formed with angular bends along their length and mounted to the insulating blocks so that the conductors capture therebetween the glass plate 32, with the conductors pushed against the respective top and bottom sides of the glass plate so that the conductors are in electrical contact with the upper and lower grids, 34 and 36, respectively.

The conductor blocks 40 and 42 each have inwardly facing slots 43 formed therein and sized to receive the edges of the glass plate 32. When the glass plate 32 is mounted to insulating blocks 40 and 42 as shown with the peripheral side edges of the glass plate 42 received in slots 43, the upper conductor 44, which as noted is resilient, is pressed against the conductive upper grid 34 in order to establish an electrical connection between the conductor and the upper grid (see, e.g., FIG. 5), and the lower conductor 46 is pressed against the conductive lower grid 36 to establish an electrical connection between the lower conductor and the lower grid. The conductors 44 and 46 make electrical contact with the grids and are energized through wires 48 and 50, which as noted, are electrically outputted from power supply 24.

Operationally, when the generator 10 is to be used, the power switch 16 is depressed (or otherwise switched to the power-on position) and the user enters the amount of time that the unit is to be run at display screen 18 (which may be, for instance, a touch sensitive screen). Operation of the unit is then initiated at the display screen, which may be provided with touch-screen capabilities if desired. This energizes power supply 24 and fan 20 begins operation. Air flow is initiated through housing 12 from the fan (in the direction of arrows A in FIG. 2), through the passageway through the housing and over both sides of the ozone generating plate 30, and through grill 22. The power output to conductors 44 and 46 and the upper and lower grids 34 and 36 is about 10,000 v and power supplied to the opposed grids causes a potential gradient that creates corona discharge from the plates. As air flows over the plate 30, oxygen in the air is converted to ozone according to well-known electrochemical reactions.

Experimental tests have shown that the ozone generator 10 described above and shown in the drawings generates around 16 g ozone per hour of operation.

While the present invention has been described in terms of preferred and illustrated embodiments, it will be appreciated by those of ordinary skill that the spirit and scope of the invention is not limited to those embodiments, but extend to the various modifications and equivalents as defined in the appended claims.

The invention claimed is:

1. An ozone generating system, comprising:
a housing:
first and second non-conductive insulating blocks in the housing to define a passageway through the first and second non-conductive insulating blocks, the passageway having an inlet and an outlet, wherein each of the first and second non-conductive insulating blocks has a slot formed therein;
a fan at the inlet and adapted to create a flow of air through the passageway;
an ozone generator in the passageway, the ozone generator defined by a glass plate having opposed first and second sides and opposed first and second side edges, a first metallic grid attached to the first side of the plate and a second metallic grid attached to the second side of the plate, wherein the ozone generator is supported in the passageway by the first side edge of the glass plate engaged in the slot in the first non-conductive insulating block and the second side edge of the glass plate engaged in the slot in the second non-conductive insulating block;
a first conductor electrically connected to the power source and to the first metallic grid;
a second conductor electrically connected to the power source and to the second metallic grid;
wherein the first conductor is defined by a resilient metal member having a first end and a second end, the first end of the first conductor mounted to the first non-conducting mounting member and the second end of the first conductor in electrical contact with the first conductive grid, and the second conductor is defined by a resilient metal member having a first end and a second end, first end of the second conductor mounted to the second non-conducting mounting member and the second end of the second conductor in electrical contact with the second conductive grid; and a power source electrically connected to each of the first and second conductors.

2. The ozone generating system according to claim 1 in which each of the first and second conductors is defined by a metal member that is resiliently biased against the metallic grid.

3. The ozone generating system according to claim 2 wherein when power is applied to the ozone generator through first and second metallic grids through the first and second conductors, respectively, a potential gradient is created across the ozone generator.

4. The ozone generating system according to claim 3 in which a corona discharge is created when the potential gradient is created across the ozone generator.

5. The ozone generating system according to claim 4 in which when power is applied to the first and second metallic grids the fan is operated to establish an air flow through the passageway from the inlet through the outlet.

6. The ozone generating system according to claim 5 in which ozone is generated as air passes over the ozone generator in the passageway and is discharged through the outlet.

7. The ozone generating system according to claim 6 including a timer for timing a duration of power being applied to the ozone generator.

8. An ozone generator comprising:
a housing:
first and second non-conducting mounting members in the housing such that a passageway is defined between the first and second non-conductive mounting members, the passageway having an inlet and an outlet, and each of the first and second non-conductive members having a slot formed therein;
an air flow generator adapted to create a flow of air from the inlet through the passageway and the outlet;
a glass plate in the passageway and having first and second opposed planar faces and opposed first and second side edges, wherein the glass plate is supported in the passageway by the first and second opposed side edges of the glass plate engaged in slots in the respective first and second non-conducting mounting members, and a first conductive grid mounted to the first planar face and a second conductive grid mounted to the second planar face, wherein the air flow through the passageway passes over the respective first and second conductive grids;
first and second conductors, each conductor defined by a resilient metal member having a first end and a second end, and wherein the first end of the first conductor is mounted to the first non-conducting mounting member and the second end of the first conductor is in electrical contact with the first conductive grid, and the first end of the second conductor is mounted to the second non-conducting mounting member and the second end of the second conductor is in electrical contact with the second conductive grid; and
a power supply electrically connected to the first conductive grid and to the second conductive grid.

9. The ozone generator according to claim 1 in which the glass plate is defined by borosilicate glass.

10. The ozone generator according to claim 9 in which the first and second conductive grids are mounted to the respective first and second opposed planar faces of the glass plate with high temperature silicone adhesive.

11. The ozone generator according to claim 9 wherein the power supply is adapted to apply power to the first and second conductive grids and to thereby create a potential gradient and create a corona discharge in the passageway.

* * * * *